(12) United States Patent
Abe

(10) Patent No.: US 10,305,382 B2
(45) Date of Patent: May 28, 2019

(54) MULTIPHASE CONVERTER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Takenori Abe, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

( * ) Notice: Subject to any disclaimer, the term of this patent is extended or adjusted under 35 U.S.C. 154(b) by 0 days.

(21) Appl. No.: 15/767,409

(22) PCT Filed: Sep. 8, 2016

(86) PCT No.: PCT/JP2016/076528
§ 371 (c)(1),
(2) Date: Apr. 11, 2018

(87) PCT Pub. No.: WO2017/073179
PCT Pub. Date: May 4, 2017

(65) Prior Publication Data
US 2018/0294721 A1 Oct. 11, 2018

(30) Foreign Application Priority Data
Oct. 28, 2015 (JP) ................. 2015-211597

(51) Int. Cl.
*H02M 3/158* (2006.01)
*H02M 3/155* (2006.01)
(Continued)

(52) U.S. Cl.
CPC ............ *H02M 3/158* (2013.01); *H02M 1/08* (2013.01); *H02M 1/14* (2013.01); *H02M 1/36* (2013.01);
(Continued)

(58) Field of Classification Search
None
See application file for complete search history.

(56) References Cited

U.S. PATENT DOCUMENTS 6,275,958 B1     8/2001   Carpenter et al.
6,465,993 B1 * 10/2002   Clarkin ................. H02M 3/156
                                                        323/272
(Continued)

FOREIGN PATENT DOCUMENTS

JP    2007-325459 A    12/2007
JP    2008-079447 A    4/2008
(Continued)

OTHER PUBLICATIONS

Search Report for PCT/JP2016/076528, dated Nov. 15, 2016.
Search Report, International Application No. PCT/JP2016/075422, dated Nov. 15, 2016.

*Primary Examiner* — Jeffrey A Gblende
(74) *Attorney, Agent, or Firm* — Honigman LLP

(57) ABSTRACT

A multiphase converter is provided with a multiphase conversion unit including a plurality of voltage conversion units; and a control unit configured to individually control the voltage conversion units using control signals. The control unit performs soft start control on the voltage conversion units by offsetting the time periods for individual voltage conversion units against each other. A detection unit detects a value reflecting an output current or an output voltage on a common output path from the plurality of voltage conversion units. The abnormality identifying unit identifies the abnormal voltage conversion unit or the abnormal group of voltage conversion units that generates an abnormal current or an abnormal voltage based on a result of detection by the detection unit during the time periods in which the soft start control is performed.

4 Claims, 3 Drawing Sheets

(51) Int. Cl.
    *H02M 1/36*     (2007.01)
    *H02M 1/08*     (2006.01)
    *H02M 1/14*     (2006.01)
    *H02M 1/32*     (2007.01)

(52) U.S. Cl.
    CPC ......... *H02M 3/155* (2013.01); *H02M 3/1588* (2013.01); *H02M 1/32* (2013.01); *H02M 2001/325* (2013.01); *H02M 2003/1586* (2013.01); *Y02B 70/1466* (2013.01)

(56) References Cited

U.S. PATENT DOCUMENTS

| | | |
|---|---|---|
| 7,405,495 B2 | 7/2008 | Guillarme et al. |
| 2006/0291512 A1* | 12/2006 | Borschowa ........... H01S 5/0683     372/38.02 |
| 2008/0018321 A1* | 1/2008 | Clavette ................ H02M 3/157     323/316 |
| 2012/0098507 A1 | 4/2012 | Hasegawa et al. |
| 2013/0051100 A1* | 2/2013 | Daigo ................. H02M 3/1584     363/124 |
| 2014/0132233 A1 | 5/2014 | Park |
| 2014/0268939 A1 | 9/2014 | Tomas et al. |
| 2015/0288169 A1 | 10/2015 | Schinzel et al. |
| 2016/0200355 A1 | 7/2016 | Mori et al. |
| 2016/0254749 A1 | 9/2016 | Kawakami |

FOREIGN PATENT DOCUMENTS

| | | |
|---|---|---|
| JP | 2008-118737 A | 5/2008 |
| JP | 2011-091938 A | 5/2011 |
| JP | 2013-046541 A | 3/2013 |
| JP | 2015-095970 A | 5/2015 |
| JP | 2015-136202 A | 7/2015 |

\* cited by examiner

MULTIPHASE CONVERTER

CROSS-REFERENCE TO RELATED APPLICATIONS

This application is the U.S. national stage of PCT/2016/076528 filed Sep. 8, 2016 which claims priority of Japanese Application No. JP 2015-211597 filed Oct. 28, 2015.

TECHNICAL FIELD

The present disclosure relates to a multiphase converter.

BACKGROUND

Multiphase DC/DC converters with a configuration in which a plurality of voltage conversion units are connected in parallel to each other are known as DC/DC converters that drive switching elements to step up or down a DC voltage. Examples of this type of multiphase DC/DC converter include a technique as disclosed in JP 2013-46541A.

Meanwhile, in such a multiphase DC/DC converter, there may be a case where only one phase fails, and if one phase fails, it may be preferable to continue the operation using the phases that have not failed, instead of halting the entire operation of the DC/DC converter. A power supply device of JP 2013-46541A addresses this need, and is configured to acquire electric current values that are detected by an electric current detector at timings of falling edges of control signals that are applied to switching elements of respective phase chopper units, and to determine that one of the phase chopper units has failed if the acquired current values are different. Even if it is detected that one of the phase chopper units has failed, the operation of the phase chopper units that have not failed is continued, and an output of a power generator is restricted so as not to exceed a withstanding electric current of the phase chopper units that have not failed.

However, the power supply device of JP 2013-46541A merely restricts the entire output if an open-circuit failure has occurred in one of the switching elements of the phase chopper units, and does not include the idea of correctly identifying a portion in which the failure has occurred, and reliably disabling the operation of this portion.

The present invention was made in view of the above-described circumstances, and it is an object thereof to realize more easily a multiphase DC/DC converter that is provided with a plurality of voltage conversion units, and can identify more specifically a portion in which an abnormality has occurred in an initial stage after the start of operation.

SUMMARY

According to the present invention, a multiphase converter includes a multiphase conversion unit provided with a plurality of voltage conversion units configured to convert an input voltage and output the converted voltage, a control unit configured to individually control the voltage conversion units using control signals so that their output is equal to a target value, and to subject, when operation of the multiphase conversion unit is started, the voltage conversion units to soft start control of gradually increasing the respective target value for their outputs, the control unit offsetting the time periods in which individual voltage conversion units or groups of voltage conversion units are subjected to soft start control against each other, a detection unit configured to detect a value reflecting at least one of an output current and an output voltage on a common output path from the plurality of voltage conversion units, and an abnormality identifying unit configured to identify an abnormal voltage conversion unit or an abnormal group of voltage conversion units that generates an abnormal current or an abnormal voltage, based on a result of detection by the detection unit during the time periods in which the soft start control is performed by the control unit.

The multiphase converter according to the present invention includes the control unit configured to individually control the voltage conversion units using control signals. The control unit subjects, when operation of the multiphase conversion unit is started, the voltage conversion units to soft start control of gradually increasing the respective target value for their outputs, the control unit offsetting the time periods in which individual voltage conversion units or groups of voltage conversion units are subjected to soft start control against each other. With such configuration, it is possible to prevent an inrush current at the start of output, and set a time period in which each voltage conversion unit or each group of voltage conversion units is subjected to soft start control.

Furthermore, the detection unit is configured to detect a value reflecting at least one of an output current and an output voltage on a common output path from the plurality of voltage conversion units. Furthermore, the abnormality identifying unit is configured to identify an abnormal voltage conversion unit or an abnormal group of voltage conversion units that generates an abnormal current or an abnormal voltage, based on a result of detection by the detection unit during the time periods in which the soft start control is performed. According to this configuration, it is possible to identify the voltage conversion unit or the group of voltage conversion units in which an abnormality has occurred in the initial stage of the start of operation of the multiphase converter. Moreover, since a value reflecting at least one of an output current and an output voltage on the common output path can be detected and an abnormality can be identified based on the value, it is possible to suppress the number of detection units.

Accordingly, it is possible to realize more easily a configuration that can identify more specifically a portion in which an abnormality has occurred in an initial stage after the start of operation.

DETAILED DESCRIPTION OF PREFERRED EMBODIMENTS

Figure 1:
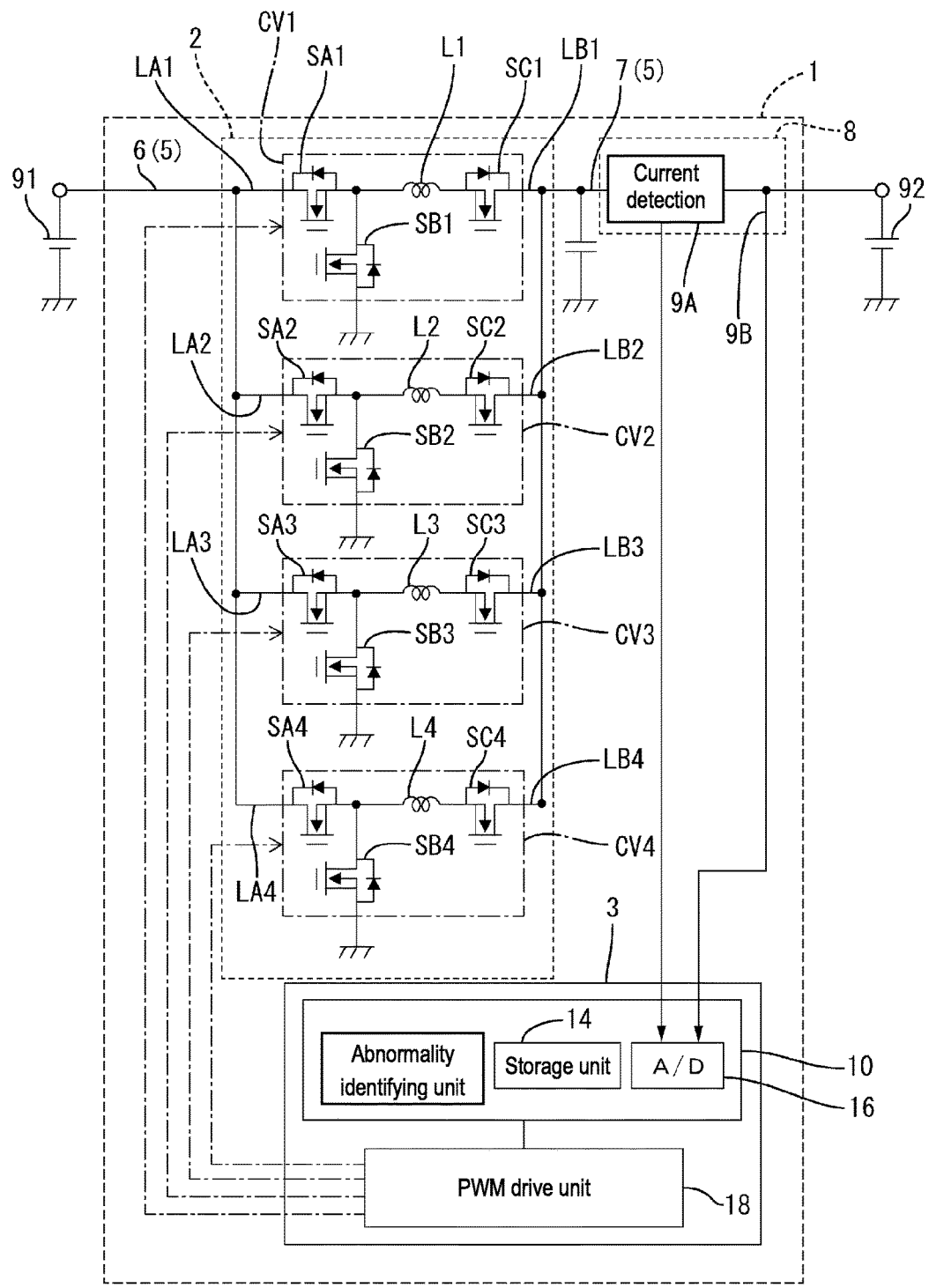
FIG. 1 is a circuit diagram schematically illustrating an example of a multiphase converter according to Embodiment 1.

Hereinafter, preferred modes of the invention will be exemplified.

In the present invention, if any abnormal voltage conversion unit or abnormal group of voltage conversion units is identified by the abnormality identifying unit, the control unit may be configured to disable execution of voltage conversion by the abnormal voltage conversion unit or the abnormal group of voltage conversion units, and enable the remaining voltage conversion units of the multiphase conversion unit at least other than the disabled abnormal voltage conversion unit or abnormal group of voltage conversion units to perform voltage conversion, the control unit setting a target value for the output of the remaining voltage conversion units that is smaller than a target value when all of the multiphase conversion units are enabled.

According to this configuration, if any abnormal voltage conversion unit or abnormal group of voltage conversion units is identified, it is possible to disable voltage conversion of the corresponding portion to protect that portion, and continue voltage conversion using the remaining voltage conversion units. Moreover, since, when voltage conversion is continued using the remaining voltage conversion units, a target value for the output that is smaller than when all of the multiphase conversion units are enabled is set, it is possible to mitigate concentration of loads caused by a reduction in the number of driven phases.

According to the present invention, a storage unit may be provided that is configured to store, if any abnormal voltage conversion unit or abnormal group of voltage conversion units is identified by the abnormality identifying unit a predetermined number of times, abnormality identification information indicating the abnormal voltage conversion unit or the abnormal group of voltage conversion units that has been identified the predetermined number of times. The control unit may be configured to disable, if the abnormality identification information is stored in the storage unit, execution of voltage conversion by the voltage conversion unit or the group of voltage conversion units that corresponds to the abnormality identification information without subjecting it to soft start control, and subject any non-corresponding voltage conversion units that do not correspond to the abnormality identification information to soft start control, when the operation of the multiphase conversion unit is started. The abnormality identifying unit may be configured to identify whether or not the non-corresponding voltage conversion units generate an abnormal current or an abnormal voltage, based on a result of detection by the detection unit during the time period in which the non-corresponding voltage conversion units are subjected to the soft start control.

According to this configuration, if abnormality identification information is stored in the storage unit, that is, if one of the voltage conversion units or a group of voltage conversion units has been identified as abnormal a predetermined number of times, then it is possible to disable execution of voltage conversion by that voltage conversion unit or that group of voltage conversion units without subjecting it to soft start control, when the operation of the multiphase conversion unit is started. In other words, it is possible to disable execution of voltage conversion by a voltage conversion unit or a group of voltage conversion units that is highly likely to fail without rechecking it, achieving prompt protection thereof. Particularly, since soft start control is not performed on the voltage conversion unit that corresponds to abnormality identification information, it is possible to shorten the length of time from the start of the operation to completion of the soft start control when the remaining voltage conversion units are driven. Furthermore, non-corresponding voltage conversion units that do not correspond to the abnormality identification information are rechecked by the abnormality identifying unit during the soft start control, and thus, even if a new abnormality has occurred in a voltage conversion unit other than the disabled voltage conversion unit, it is possible to identify the abnormality.

According to the present invention, a storage unit may be provided that is configured to store, each time an abnormal voltage conversion unit or an abnormal group of voltage conversion units is identified by the abnormality identifying unit, phase information indicating the identified abnormal voltage conversion unit or abnormal group of voltage conversion units in association with the number of times of identification. The control unit may be configured to disable, if the phase information is stored in the storage unit and the number of times of identification for an corresponding voltage conversion unit or a corresponding group of voltage conversion units that is indicated by the phase information has reached a predetermined plurality of times, execution of voltage conversion by the corresponding voltage conversion unit or the corresponding group of voltage conversion units without subjecting it to soft start control, and subject, if the phase information is stored in the storage unit and the number of times of identification has not reached the predetermined plurality of times, the corresponding voltage conversion unit or the corresponding group of voltage conversion units to soft start control, when the operation of the multiphase conversion unit is started. When the corresponding voltage conversion unit or the corresponding group of voltage conversion units is subjected to soft start control, the abnormality identifying unit may be configured to identify again whether or not the corresponding voltage conversion unit or the corresponding group of voltage conversion units generates an abnormal current or an abnormal voltage based on a result of detection by the detection unit. Also, the control unit may be configured to disable, if it is again identified by the abnormality identifying unit that the corresponding voltage conversion unit or the corresponding group of voltage conversion units generates an abnormal current or an abnormal voltage, execution of voltage conversion by the corresponding voltage conversion unit or the corresponding group of voltage conversion units, and to continue, if no such identification is made again, voltage conversion of at least the corresponding voltage conversion unit or group of voltage conversion units, when the operation of the multiphase conversion unit is started.

According to this configuration, if one of voltage conversion units or a group of voltage conversion units has been identified as abnormal a predetermined plurality of times, it is possible to disable execution of voltage conversion by the voltage conversion unit or the group of voltage conversion units without subjecting it to soft start control, when the operation of the multiphase conversion unit is started. In other words, it is possible to disable execution of voltage conversion by a voltage conversion unit or a group of voltage conversion units that is highly likely to fail without rechecking it, achieving prompt protection thereof. Particularly, since soft start control is not performed on the voltage conversion unit that has been identified as abnormal a predetermined plurality of times, it is possible to shorten the length of time from the start of the operation to completion of the soft start control when the remaining voltage conversion units are driven.

On the other hand, the voltage conversion unit or the group of voltage conversion units that has been identified as abnormal a number of times less than the predetermined plurality of times can be subjected to soft start control and can be rechecked when the operation of the multiphase conversion unit is started. Also, if, during the soft start control, the voltage conversion unit or the group of voltage conversion units is again identified as generating an abnormal current or an abnormal voltage, then it is possible to disable voltage conversion of the voltage conversion unit or the group of voltage conversion units and promptly protect it. In contrast, if, during the soft start control, the voltage conversion unit or the group of voltage conversion units is not again identified as generating an abnormal current or an abnormal voltage, then it is possible to continue the voltage conversion of the voltage conversion unit or the group of voltage conversion units. In other words, even if one of the voltage conversion units or a group of voltage conversion units has been identified as abnormal in the past due to some sort of reason, there is a possibility that the previous identification of abnormality may be made due to a temporary reason (such as noise) if the number of times when an abnormality has been identified is small and an abnormal state is no longer given when the multiphase conversion unit is newly activated. In such cases where there is a high likelihood in which no fundamental failure or the like has occurred, it is possible to continue voltage conversion of the voltage conversion unit or the group of voltage conversion units, ensuring the number of phases.

Embodiment 1

The following will describe Embodiment 1 in which the present invention is embodied.

A multiphase converter 1 shown in FIG. 1 is configured as, for example, an on-board multiphase DC/DC converter, and is configured to convert a DC voltage (input voltage) applied to an input-side conductive path 6 by stepping down that voltage with a multiphase scheme, and to output an output voltage obtained by stepping down the input voltage to an output-side conductive path 7.

The multiphase converter 1 is provided with: a power supply line 5 including the input-side conductive path 6 and the output-side conductive path 7; a multiphase conversion unit 2 including m voltage conversion units CV1, CV2, ... CVm configured to convert an input voltage and output the converted voltage; and a control unit 3 configured to individually control the voltage conversion units CV1, CV2, ... CVm using control signals. Note that m, which is the number of the voltage conversion units, should be an integer of 2 or more. Hereinafter, a description will be given taking a configuration shown in FIG. 1, that is, a case where m=4, as a representative example.

The input-side conductive path 6 is configured as, for example, a primary side (high voltage side) power supply line to which a relatively high voltage is applied, and is conductively connected to the high potential-side terminal of a primary side power supply portion 91, and has a configuration in which a predetermined DC voltage (48V, for example) is applied from the primary side power supply portion 91. The input-side conductive path 6 is connected to individual input paths LA1, LA2, LA3, and LA4 of the voltage conversion units CV1, CV2, CV3, and CV4. The primary side power supply portion 91 is constituted by, for example, an electrical storage means such as a lithium-ion battery or an electrical double layer capacitor, and the high potential-side terminal thereof is kept at 48V for example, and the low potential-side terminal thereof is kept at a ground potential (0V) for example.

The output-side conductive path 7 is configured as a secondary side (low voltage side) power supply line to which a relatively low voltage is applied. The output-side conductive path 7 is conductively connected to, for example, the high potential-side terminal of a secondary side power supply portion 92, and has a configuration in which a DC voltage (12V, for example) smaller than an output voltage of the primary side power supply portion 91 is applied from the secondary side power supply portion 92. The secondary side power supply portion 92 is constituted by, for example, an electrical storage means such as a lead storage battery, and the high potential-side terminal thereof is kept at 12V for example, and the low potential-side terminal thereof is kept at the ground potential (0V) for example.

The multiphase conversion unit 2 is provided between the input-side conductive path 6 and the output-side conductive path 7. The multiphase conversion unit 2 includes m voltage conversion units CV1, CV2, ... CVm that are connected in parallel between the input-side conductive path 6 and the output-side conductive path 7. The m voltage conversion units CV1, CV2, ... CVm all have the same configuration, and each serves as a synchronous rectification type step-down converter. The individual input paths LA1, LA2, ... LAm of the m voltage conversion units CV1, CV2, ... CVm are branched from the input-side conductive path 6. Also, individual output paths LB1, LB2, ... LBm of the m voltage conversion units CV1, CV2, ... CVm are connected to the output-side conductive path 7, which is a common output path. Note that the m voltage conversion units CV1, CV2, ... CVm correspond to a first phase, a second phase, ..., an m-th phase, respectively.

The following will describe a k-th phase voltage conversion unit CVk of the m voltage conversion units CV1, CV2, ... CVm, where k is an integer equal to or smaller than m. The k-th phase voltage conversion unit CVk is provided with a high-side switching element SAk, a low-side switching element SBk, an inductor Lk, and a protective switching element SCk. For example, the first phase voltage conversion unit CV1 is provided with a high-side switching element SA1, a low-side switching element SB1, an inductor L1, and a protective switching element SC1, and the second phase voltage conversion unit CV2 is provided with a high-side switching element SA2, a low-side switching element SB2, an inductor L2, and a protective switching element SC2. The same applies to the third and the fourth phase voltage conversion units.

In the k-th phase voltage conversion unit CVk, the switching element SAk is configured as an N-channel type MOSFET, and an individual input path LAk, which is branched from the input-side conductive path 6, is connected to a drain of the switching element SAk. A drain of the low-side switching element SBk and one end of the inductor Lk are connected to a source of the switching element SAk. The drain of the switching element SBk is connected to a connection point between the switching element SAk and the inductor Lk, and a source of the switching element SBk is grounded. The other end of the inductor Lk is connected to a source of the switching element SCk. A drain of the switching element SCk is connected to the output-side conductive path 7. Note that the switching element SCk functions to interrupt the conduction of the path in case of abnormality such as an overcurrent, an overvoltage, or a reverse flow.

The control unit 3 mainly includes a control circuit 10 and a PWM drive unit 18. The control circuit 10 includes a microcomputer with a CPU, for example. The control circuit 10 is provided with: a portion (such as the CPU) serving as an abnormality identifying unit; a storage unit 14 constituted by a ROM, a RAM, a nonvolatile memory, and the like; and an A/D converter 16 configured to convert an analog voltage into a digital signal. A voltage value output from a current detection unit 9A, which will be described later, and a voltage value on the output-side conductive path 7 are input to the A/D converter 16.

In the control unit 3, the control circuit 10 has functions of determining a duty ratio, and generating and outputting a PWM signal having the determined duty ratio, that is, the control circuit 10 generates and outputs PWM signals for the respective m voltage conversion units CV1, CV2, ... CVm. For example, when all of the m voltage conversion units CV1, CV2, ... CVm are driven in a steady output state after completion of soft start control, which will be described later, the control circuit 10 generates PWM signals whose phases differ from each other by $2\pi/m$, and outputs the generated PWM signals to the respective m voltage conversion units CV1, CV2, ... CVm. If, for example, there are four voltage conversion units CV1, CV2, CV3, and CV4 as shown in FIG. 1, then PWM signals whose phases differ from each other by $2\pi/4$ are given to the respective voltage conversion units.

The PWM drive unit 18 applies ON signals for alternately turning on the switching elements SAk and SBk of each phase (where k is an integer of 1 to m), based on the PWM signal for each phase generated by the control circuit 10, to the gates of the switching elements SAk and SBk. While the PWM signals are output to the switching elements SAk and SBk, the signal that is output to the gate of the switching element SBk has its phase substantially inverted with respect to that of the signal output to the gate of the switching element SAk, while a dead time is ensured.

A detection unit 8 is provided with the current detection unit 9A for detecting an output current, and a voltage detection unit 9B for detecting an output voltage, the current detection unit 9A and the voltage detection unit 9B respectively detecting values reflecting the output current and output voltage on the common output path (output-side conductive path 7) from the plurality of voltage conversion units CV1, CV2, ... CVm. The current detection unit 9A should be configured to output, as a detected value, a voltage value that corresponds to a current flowing through the output-side conductive path 7. For example, the current detection unit 9A includes a resistor and a differential amplifier that are provided on the output-side conductive path 7 such that a voltage between both ends of the resistor is input to the differential amplifier, the amount of voltage drop occurring in the resistor due to a current flowing through the output-side conductive path 7 is amplified by the differential amplifier, and the amplified amount of voltage drop is output to the A/D converter 16 of the control circuit 10 as a detected value. The voltage detection unit 9B is configured as, for example, a path through which a value reflecting the voltage on the output-side conductive path 7 (such as the voltage itself or a divided voltage of the output-side conductive path 7) is input to the A/D converter 16 of the control circuit 10, and in the example of FIG. 1, the voltage detection unit 9B is configured to be branched from the output-side conductive path 7, and is conductively connected to the A/D converter 16 of the control circuit 10.

In the multiphase converter 1 with such a configuration, the control unit 3 outputs complementary PWM signals to the respective m voltage conversion units CV1, CV2, ... CVm with a dead time set. For example, with respect to the gates of the switching elements SAk and SBk of the k-th phase voltage conversion unit CVk, the control unit 3 outputs an OFF signal to the gate of the switching element SBk while outputting an ON signal to the gate of the switching element SAk, and outputs an ON signal to the gate of the switching element SBk while outputting an OFF signal to the gate of the switching element SAk, with a dead time set. In response to such complementary PWM signals, the voltage conversion unit CVk switches the switching element SAk ON and OFF in synchronization with switching the switching element SBk ON and OFF, to step down a DC voltage applied to the individual input path LAk, and output the resultant DC voltage to the individual output path LBk. The output voltage of the individual output path LBk depends on the duty ratio of the PWM signal applied to the gates of the switching elements SAk and SBk. The same control is performed for every integer k from 1 to m, that is, the same control is performed on the first to the m-th phase voltage conversion units.

When activating the multiphase conversion unit 2, the control unit 3 individually controls a portion or all of the plurality of voltage conversion units CV1, CV2, ... CVm using control signals (PWM signals), and performs feedback control so that the output from the multiphase conversion unit 2 is equal to a set target value. Specifically, based on a current value on the output-side conductive path 7 input to the control circuit 10 and a target value for output current (target current value), the control unit 3 determines a control amount (duty ratio) using known PID control feedback calculation. For example, in a steady output state in which the number of driven phases (driven phase number) is N, the target value for output current (target current value) is fixed at a value that corresponds to the driven phase number N, and PWM signals with the duty ratio determined by the feedback calculation are respectively output to N voltage conversion units with the phases that differ from each other by $2\pi/N$.

The following will describe abnormality detection during a normal operation.

Figure 2:
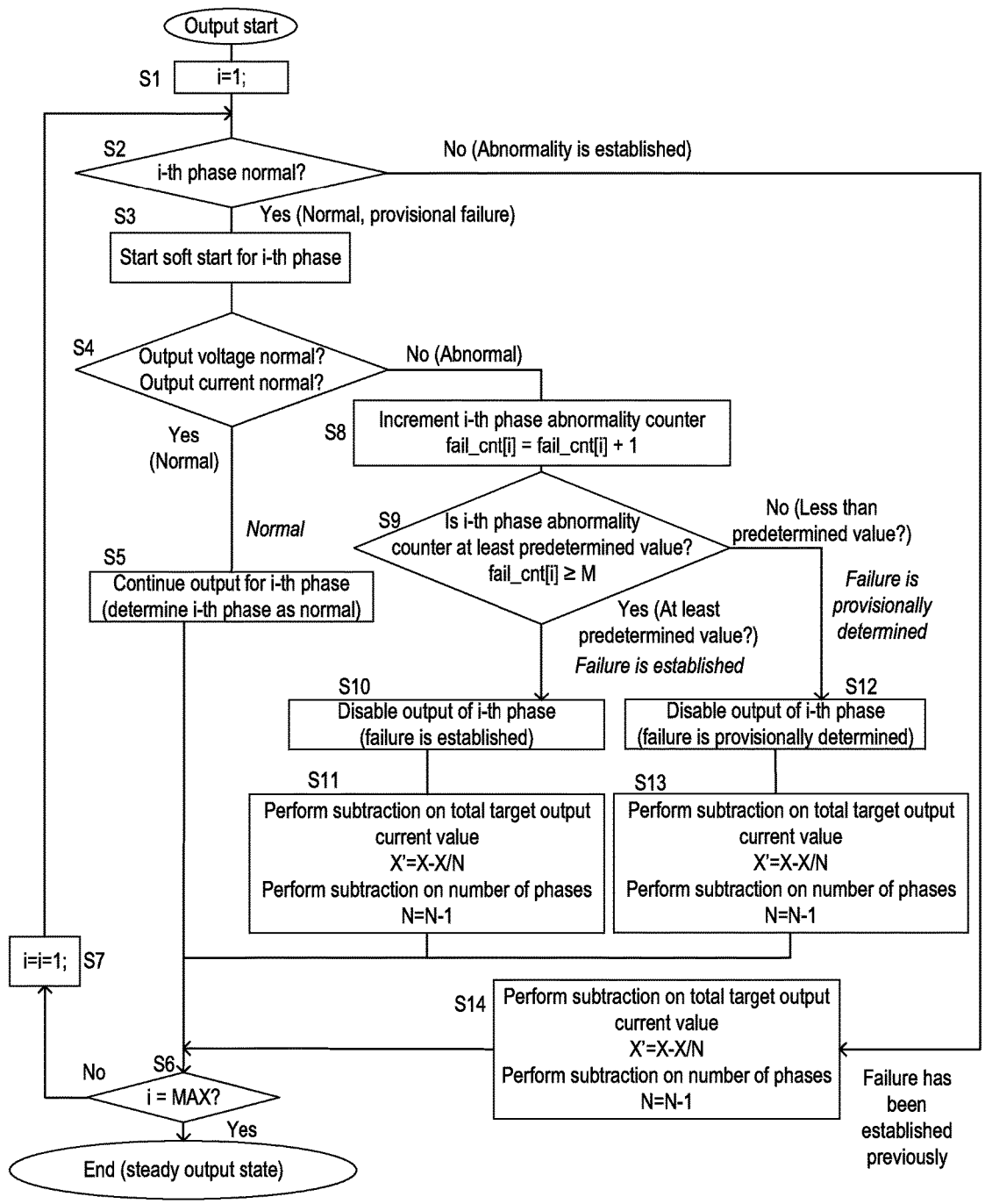
FIG. 2 is a flowchart illustrating an example of a flow of control when the multiphase converter of Embodiment 1 is started to perform output.

In the multiphase converter 1, the control unit 3 performs control in accordance with the flow of FIG. 2 when a predetermined operation start condition is met. The operation start condition is, for example, an ignition signal being switched from OFF to ON or the like, or may be another operation start condition.

At a point in time when control of FIG. 2 is started, the control unit 3 sets the value of N, which indicates the number of driven phases, to the number m (maximum phase number) of voltage conversion units CV1, CV2, ... CVm constituting the multiphase conversion unit 2. In other words, at a point in time when control of FIG. 2 is started, N=m is met and N=m=4 is met if the multiphase conversion unit 2 is constituted by four voltage conversion units CV1, CV2, CV3, and CV4, as shown in FIG. 1. Furthermore, at a point in time when control of FIG. 2 is started, a target value for the output (target current value) X of the multiphase conversion unit 2 in the steady output state is set to a fixed value when all of the phases of the multiphase conversion unit 2 is driven.

At the start of the control of FIG. 2, i, which is a value indicating the target phase count, is set to 1 (step S1). After the processing of S1, it is determined whether or not the i-th voltage conversion unit of the m voltage conversion units CV1, CV2, ... CVm is normal (step S2). In the determination processing of S2, the determination results in "NO" if the i-th phase has been subjected to processing of step S10 in the past and a failure of the i-th phase has been established (found), whereas the determination results in "YES" if no failure of the i-th phase has been established. The method for determining whether or not a failure has been established will be described later.

If, in step S2, it is determined that the i-th phase voltage conversion unit is normal, that is, if no failure of the i-th phase voltage conversion unit has been established, then the procedure advances to "YES" in step S2, and soft start control is performed on the i-th phase voltage conversion unit (step S3). When soft start control is performed on the i-th phase voltage conversion unit in step S3, the control unit 3 gradually increases with time the target value (target current value) from the initial value at a point in time when the processing of step S3 is started (initial value when the i-th phase is subjected to soft start), and repeatedly performs processing for determining the control amount (duty ratio) using known PID control feedback calculation based on the target value (target current value) and the current value on the output-side conductive path 7 detected by the current detection unit 9A. Accordingly, the output current from the i-th phase voltage conversion unit is gradually increased.

Figure 3:
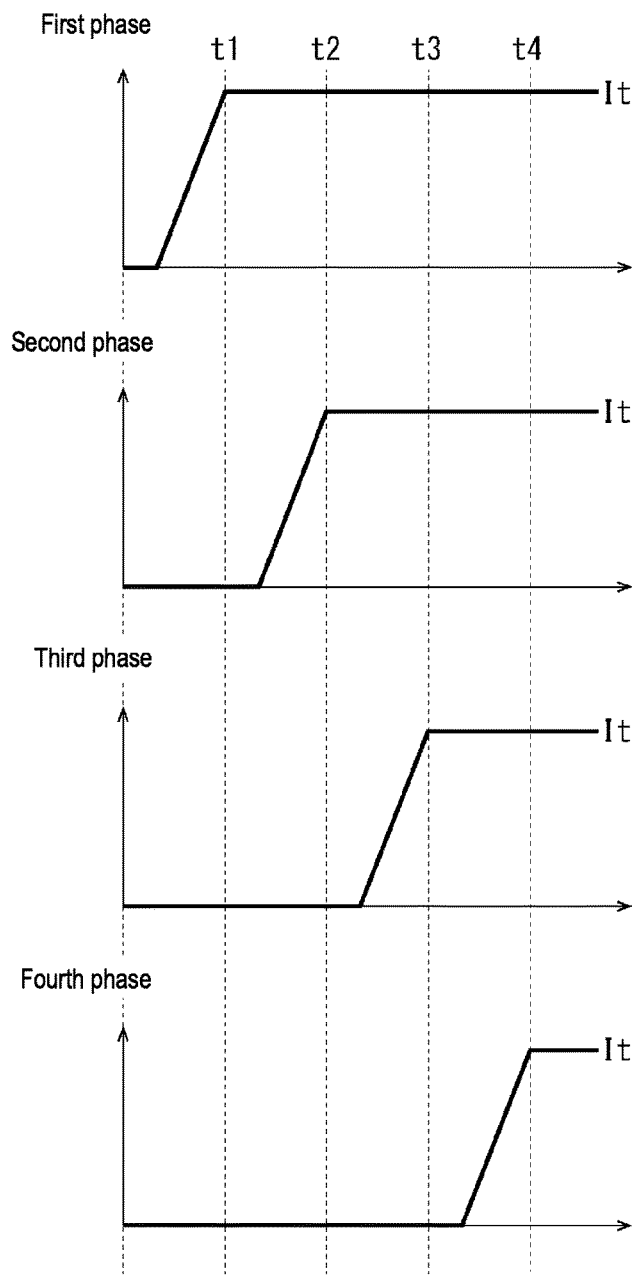
FIG. 3 is a graph illustrating an example of relationship between control target current values for respective phases and time when the multiphase converter of Embodiment 1 is started to perform output.

For example, when i=1 is met in the processing of step S3, the target current value is 0(A) at a point in time when the processing of step S3 is started, and during the soft start control for the first phase, the target current value is gradually increased from 0(A) up to a target current value It for all phases in the steady output state, as shown in FIG. 3. Furthermore, when i=2 is met in the processing of step S3, the target current value for the first phase is It and the target current value for the second phase is 0(A) at a point in time when the processing of step S3 is started (that is, at a point in time immediately after the soft start control for the first phase was complete). The control unit 3 performs soft start control for the second phase after a time t1 at which the soft start control for the first phase was complete, and gradually increases the target current value from 0(A) up to the target current value It for all phases in the steady output state. The same applies to soft start control for the third and fourth phases.

After the start of the soft start control for the i-th phase in step S3, the control unit 3 determines whether or not the output current and the output voltage on the output-side conductive path 7 have been kept in the normal state during the soft start control for the i-th phase (step S4). Specifically, a normal current range and a normal voltage range are defined in association with the soft start control for each phase, and assuming that in the soft start control for the i-th phase, the normal current range is set to be from IAi to IBi and the normal voltage range is set to be from VAi to VBi, the control unit 3 determines, in step S4, that the output current is in the normal state if the current value Io flowing through the output-side conductive path 7 is kept at IAi≤Io≤IBi during the soft start control for the i-th phase, and the output current is in the abnormal state if Io<IAi or Io>IBi is met during the soft start control for the i-th phase. Furthermore, the control unit 3 determines that the output voltage is in the normal state if the voltage value Vo on the output-side conductive path 7 is kept at VAi≤Vo≤VBi during the soft start control for the i-th phase, and the output voltage is in the abnormal state if Vo<VAi or Vo>VBi is met during the soft start control for the i-th phase.

If, in the processing of step S4, it is determined that the output current and the output voltage are normal during the soft start control for the i-th phase, then the procedure advances to "YES" in step S4, the i-th phase voltage conversion unit is determined to be normal, and the i-th phase voltage conversion unit continues its output (step S5). Then, after completion of the soft start control for the i-th phase, it is determined whether or not the actual value of i is a maximum value MAX (that is, the number of voltage conversion units in the multiphase conversion unit 2) (step S6), and if it is determined in the processing of step S6 that the value of i is the maximum value MAX, that is, when the procedure from step S2 onward is complete for all of the phases of the multiphase conversion unit 2, then the procedure advances to "YES" in step S6, and the procedure of FIG. 2 ends. If it is determined in the processing of step S6 that the value of i is not the maximum value MAX, then the procedure advances to "NO" in step S6, the value of i is incremented (step S7), and the procedure from step S2 onward is performed for the next phase.

If it is determined in step S4 that at least one of the output current and the output voltage is not normal during the soft start control for the i-th phase, then the procedure advances to "NO" in step S4, and an abnormality counter for the i-th phase is incremented. In the present configuration, abnormality counters are provided in association with the respective phases such that fail_cnt[1] is the abnormality counter that corresponds to the first phase voltage conversion unit CV1, fail_cnt[2] is the abnormality counter that corresponds to the second phase voltage conversion unit CV2, . . . , fail_cnt[m] is the abnormality counter that corresponds to the m-th phase voltage conversion unit CVm. Information relating to the abnormality counters for the respective phases is stored in a portion of the storage unit 14 (for example, a nonvolatile memory or the like). If the procedure advances to "NO" in step S4, then fail_cnt[i], which is the abnormality counter for the i-th phase, is incremented in the processing of step S8. For example, if i=1, then the value of fail_cnt[1], which is the abnormality counter for the first phase, will be incremented by 1 in step S8.

Then, in the processing of step S9 conducted after the processing of step S8, it is determined whether or not the value of fail_cnt[i] incremented in the processing of step S8 is at least a predetermined value M defined in advance. The predetermined value M may be set as an integer of 2 or more, for example.

If, in the processing of step S9, it is determined that the value of fail_cnt[i] is at least the predetermined value M, then the i-th phase voltage conversion unit is disabled, and the i-th phase voltage conversion unit is established as failed. In this case, failure establishment information indicating that the failure of the i-th phase has been established will be stored in the storage unit 14 (step S10). Note that the failure establishment information may be information indicating fail_cnt[i]=M, or another failure establishment flag, for example. Then, after the i-th phase voltage conversion unit has been disabled in the processing of step S10, a subtraction is performed on the target value for the output of the entire multiphase conversion unit 2 (total target output current value) (step S11). Specifically, a new target current value (total target output current value) X' is set as X'=X−X/N, based on the target current value (total target output current value) X set before the processing of step S11, and the driven phase number N set before the processing of step S11. In other words, the number of driven phases is reduced by one phase, and thus the ratio of the target current value is reduced by one phase. X' thus obtained serves as the updated value of X. Accordingly, X is updated to a new target current value (total target output current value) X' and then 1 is subtracted from the driven phase number N.

If, in the processing of step S9, it is determined that the value of fail_cnt[i] is less than the predetermined value M, then the procedure advances to "NO" in step S9, the i-th phase voltage conversion unit is disabled, and the i-th phase voltage conversion unit is provisionally established as failed (step S12). Then, after the i-th phase voltage conversion unit has been disabled in the processing of step S12, a subtraction is performed on the target value for the output of the entire multiphase conversion unit 2 (total target output current value) (step S13). Specifically, a new target current value (total target output current value) X' is set as X'=X−X/N, based on the target current value (total target output current value) X set before the processing of step S13, and the driven phase number N set before the processing of step S13. X' thus obtained serves as the updated value of X. Accordingly, X is updated to a new target current value (total target output current value) X', and then 1 is subtracted from the driven phase number N.

Furthermore, in the control of FIG. 2, if it is determined in the processing of step S2 that the i-th phase voltage conversion unit has been established as abnormal, that is, if a failure of the i-th phase voltage conversion unit has been established, then the procedure advances to "NO" in step S2. In other words, if the i-th phase voltage conversion unit has been subjected to the processing of step S10 in the past and the above-described failure establishment information indicating that a failure of the i-th phase has been established is stored in the storage unit 14, then the procedure advances to "NO" in step S2. When the procedure advances to "NO" in the processing of step S2, a subtraction is performed on the target value for the output of the entire multiphase conversion unit 2 (total target output current value) (step S14). In other words, this phase will not be subjected to soft start control and will remain disabled. In the processing of step S14, a new target current value (total target output current value) X' is set as X'=X−X/N, based on the target current value (total target output current value) X set before the processing of step S14 and the driven phase number N set before the processing of step S14. X' thus obtained serves as the updated value of X. Accordingly, X is updated to a new target current value (total target output current value) X', and then 1 is subtracted from the driven phase number N.

The control of FIG. 2 is performed in the above-described manner, and if it is determined in the processing of step S6 that the value of i is the maximum value MAX, then the procedure of FIG. 2 ends, and voltage conversion is performed in the steady output state. In the steady output state, voltage conversion is performed by N voltage conversion units that is continuing operations at a point in time when the procedure advances to "YES" in step S6 so that the target current value (total target output current value) X at a point in time when the procedure advances to "YES" in step S6 is equal to the target value for the output current. The target current value of the N voltage conversion units is X/N, and PWM signals having the duty ratio determined by the feedback calculation are output to the respective N voltage conversion units with their phases differing from each other by 2π/N.

As described above, in the present configuration, the control unit 3 subjects, when the operation of the multiphase conversion unit 2 is started, the respective m voltage conversion units CV1, CV2, . . . CVm to soft start control of gradually increasing the target value for output, the control unit 3 offsetting the time periods for individual voltage conversion units against each other as shown in FIG. 3. Note that in the graphs in FIG. 3 showing the phases, vertical axes denote the target current values for the respective phases, and the horizontal axes denote the elapsed time. The process is such that, as shown in FIG. 3, the second phase soft start is performed after a termination time t1 of the first phase soft start, and the third phase soft start is performed after a termination time t2 of the second phase soft start, namely, the k+1-th phase soft start is performed after a termination time tk of the k-th phase soft start.

Also, as shown in steps S3 and S4 of FIG. 2, the control unit 3 identifies an abnormal voltage conversion unit that generates an abnormal current or an abnormal voltage, based on a result of detection by the detection unit 8 during the time periods in which the soft start control is performed. If an abnormal voltage conversion unit is identified, then the control unit 3 disables execution of voltage conversion by the abnormal voltage conversion unit in step S10 or S12, and enables the remaining voltage conversion units of the multiphase conversion unit 2 at least other than the disabled abnormal voltage conversion unit to perform voltage conversion as in steps S11 and S13, in which the control unit 3 sets a smaller target value for the output for the remaining voltage conversion units than the target value when all of the multiphase conversion units are enabled.

Furthermore, each time an abnormal voltage conversion unit is identified by the control unit 3 (abnormality identifying unit) as shown in step S8 of FIG. 2, the storage unit 14 updates the abnormality counter associated with the identified voltage conversion unit, and stores phase information indicating the identified abnormal voltage conversion unit in association with the number of times of identification. Specifically, the phase information refers to information relating to the abnormality counter whose value is at least 1, and the number of times of identification refers to the value indicated by the abnormality counter whose value is at least 1. Also, if an abnormal voltage conversion unit is identified a predetermined number of times (predetermined value M) by the control unit 3 (abnormality identifying unit), then the storage unit 14 stores failure establishment information, which indicates that a failure has been established. The failure establishment information is abnormality identification information indicating an abnormal voltage conversion unit that has been identified a predetermined number of times, and the failure establishment information (abnormality identification information) is, for example, information relating to the abnormality counter whose value is at least the predetermined value M.

Furthermore, if phase information (information relating to abnormality counters whose value is at least 1) is stored in the storage unit 14 and the number of times of identification for the voltage conversion unit indicated by the phase information has reached a predetermined plurality of times (predetermined value M) (that is, when abnormality identification information is stored in the storage unit 14), then the control unit 3 advances to "NO" in step S2 of FIG. 2 to perform the processing of step S14, where the control unit 3 does not perform soft start control on the voltage conversion unit indicated by the phase information (that is, the voltage conversion unit that corresponds to the abnormality identification information) and disables voltage conversion thereof.

Furthermore, if phase information is stored in the storage unit 14 and the number of times of identification has not reached a predetermined plurality of times (predetermined value M) at the start of operation of the multiphase conversion unit 2, then the control unit 3 advances the procedure from step S2 to step S3 of FIG. 2 to perform soft start control on the voltage conversion unit indicated by the phase information (non-corresponding voltage conversion unit). When performing soft start control on the non-corresponding voltage conversion unit, the control unit 3 (abnormality identifying unit) performs the processing of step S4, and identifies again whether or not this non-corresponding voltage conversion unit generates an abnormal current or an abnormal voltage based on a result of detection in the detection unit 8. If it is again identified that this non-corresponding voltage conversion unit generates an abnormal current or an abnormal voltage, then the control unit 3 advances to "NO" in step S4, and disables, in the subsequent processing of step S10 or S12, execution of voltage conversion by the non-corresponding voltage conversion unit. In contrast, if no such identification is made again, the procedure advances to "YES" in step S4, and at least the non-corresponding group of voltage conversion units continue the voltage conversion.

The following will describe examples of effects of the present configuration.

The multiphase converter 1 of the present configuration is provided with the control unit 3 configured to control the respective m voltage conversion units CV1, CV2, . . . CVm using control signals (PWM signals). The control unit 3 subjects, when the operation of the multiphase conversion unit 2 is started, the respective voltage conversion units CV1, CV2, . . . CVm to soft start control of gradually increasing a target value for output, the control unit 3 offsetting the time periods for individual voltage conversion units against each other. With such configurations, it is possible to prevent an inrush current at the start of output, and set a time period in which each of the voltage conversion units CV1, CV2, . . . CVm is subjected to soft start control.

Furthermore, the detection unit 8 is configured to detect values reflecting an output current and an output voltage on the common output path (output-side conductive path 7) from the plurality of voltage conversion units CV1, CV2, . . . CVm. Also, the control unit 3, which corresponds to the abnormality identifying unit, is configured to identify the abnormal voltage conversion unit that generates an abnormal current or an abnormal voltage based on a result of detection by the detection unit 8 during the time periods in which the soft start control is performed. According to this configuration, it is possible to identify the voltage conversion unit in which an abnormality has occurred in the initial stage of the start of operation of the multiphase converter. Moreover, since a value reflecting at least one of an output current and an output voltage on the common output path can be detected and an abnormality can be identified based on this value, it is possible to suppress the number of detection units. Accordingly, it is possible to realize more easily a configuration that can identify more specifically a portion in which an abnormality has occurred in an initial stage after the start of operation.

In the present configuration, if an abnormal voltage conversion unit is identified, it is possible to protect the corresponding portion by disabling voltage conversion of that portion, and continue voltage conversion using the remaining voltage conversion units. Moreover, since, when voltage conversion is continued using the remaining voltage conversion units, a smaller target value for output is set than when all of the multiphase conversion units are enabled, it is possible to mitigate concentration of loads caused by a reduction in the number of driven phases.

In the present configuration, if abnormality identification information (abnormality counter whose value indicates a predetermined value M or more) is stored in the storage unit 14, that is, if one of the voltage conversion units has been identified as abnormal a predetermined number of times, then it is possible to disable execution of voltage conversion by that voltage conversion unit without subjecting it to soft start control, when operation of the multiphase conversion unit 2 is started. In other words, it is possible to disable execution of voltage conversion by a voltage conversion unit that is highly likely to fail without rechecking it, achieving prompt protection thereof. Particularly, since soft start control is not performed on the voltage conversion unit that corresponds to abnormality identification information, it is possible to reduce the length in time from the operation start to the completion of soft start control when the remaining voltage conversion units are driven.

Furthermore, non-corresponding voltage conversion units that do not correspond to the abnormality identification information are rechecked by the abnormality identifying unit during the soft start control, and thus, even if a new abnormality has occurred in a voltage conversion unit other than the disabled voltage conversion unit, it is possible to identify the abnormality.

For example, any voltage conversion unit that has been identified as abnormal a number of times less than a predetermined plurality of times (that is, the voltage conversion unit that is identified by the abnormality counter whose value indicates at least 1 and less than the predetermined value M) can be subjected to soft start control and can be rechecked when the operation of the multiphase conversion unit 2 is started. Also, if, during the soft start control, any voltage conversion unit is again identified as generating an abnormal current or an abnormal voltage, then it is possible to disable voltage conversion of the voltage conversion unit and promptly protect it. In contrast, if, during the soft start control, a voltage conversion unit is not again identified as generating an abnormal current or an abnormal voltage, then it is possible to continue the voltage conversion of the voltage conversion unit. In other words, even if one of the voltage conversion units has been identified as abnormal in the past due to some sort of reason, there is a possibility that the previous identification of abnormality may be made due to a temporary reason (such as noise) if the number of times when an abnormality has been identified is small and an abnormal state is no longer given when the multiphase conversion unit 2 is newly activated. In such cases where there is a high likelihood in which no fundamental failure or the like has occurred, to continue voltage conversion of voltage conversion unit, ensuring the number of phases.

Embodiment 2

The following will describe Embodiment 2.

Embodiment 2 has the same hardware configuration as that in Embodiment 1. In other words, a multiphase converter 1 of Embodiment 2 is provided with, similar to FIG. 1: a multiphase conversion unit 2 including m voltage conversion units CV1, CV2, . . . CVm configured to convert an input voltage and output the converted voltage; and a detection unit 8 configured to detect a value reflecting an output current and an output voltage on the common output path (output-side conductive path 7) from the m voltage conversion units CV1, CV2, . . . CVm.

Furthermore, also in Embodiment 2, a control unit 3 is configured to individually control the m voltage conversion units CV1, CV2, . . . CVm using control signals (PWM signals) so that their output is equal to a target value, and subject, when the operation of the multiphase conversion unit 2 is started, the m voltage conversion units CV1, CV2, . . . CVm to soft start control of gradually increasing a target value for output. Note that, in Embodiment 2, the control unit 3 performs the soft start control by offsetting the time periods for individual groups of voltage conversion units against each other. For example, in the example of FIG. 1, a group of the first phase and the second phase is first subjected to soft start control, and after completion of the soft start control on that group, a group of the third phase and the fourth phase is subjected to soft start control. If the number of phases is greater than 4, then it is sufficient to increase the number of groups such as a group of a fifth phase and a sixth phase.

Then, the control unit 3 identifies any abnormal group of voltage conversion units that generates an abnormal current or an abnormal voltage, based on a result of detection by the detection unit 8 during the time periods in which the soft start control is performed for the groups. The same method for determining an abnormal current and an abnormal voltage during soft start control as that in Embodiment 1 can be used. If an abnormal group of voltage conversion units is identified, then the control unit 3 disables execution of voltage conversion by the identified abnormal group of voltage conversion units, and enables the remaining voltage conversion units of the multiphase conversion unit 2 at least other than the disabled abnormal group of voltage conversion units to perform voltage conversion, in which the control unit 3 sets a target value for output for the remaining voltage conversion units that is smaller than a target value when all of the multiphase conversion unit 2 are enabled. For example, if two phases are disabled, then the target value is set to a value obtained by subtracting a target value X1/2 for one phase from the target value (target current value) X1 when all of the phases (all phases) of the multiphase conversion unit 2 are driven.

In this case, each time an abnormal group of voltage conversion units is identified by the control unit 3 (abnormality identifying unit), the storage unit 14 updates the abnormality counter associated with the identified group of voltage conversion units, and stores phase information indicating the identified abnormal group of voltage conversion units in association with the number of times of identification. In this configuration, the phase information refers to information relating to the abnormality counter whose value is at least 1, and the number of times of identification refers to the value indicated by the abnormality counter whose value is at least 1. Also, if an abnormal group of voltage conversion units is identified a predetermined number of times (predetermined value M) by the control unit 3 (abnormality identifying unit), then the storage unit 14 stores failure establishment information, which indicates that a failure has been established. The failure establishment information is abnormality identification information indicating an abnormal group of voltage conversion units that has been identified a predetermined number of times, and the failure establishment information (abnormality identification information) is, for example, information relating to the abnormality counter whose value is at least the predetermined value M.

Furthermore, if, at the start of operation of the multiphase conversion unit 2, phase information (information relating to the abnormality counter whose value is at least 1) is stored in the storage unit 14 and the number of times of identification for the group of voltage conversion units indicated by the phase information has reached a predetermined plurality of times (predetermined value M) (that is, when abnormality identification information is stored in the storage unit 14), then the control unit 3 does not perform soft start control on the group of voltage conversion units indicated by the phase information (that is, the group of voltage conversion units that corresponds to the abnormality identification information) and disables voltage conversion thereof.

Furthermore, if phase information is stored in the storage unit 14 and the number of times of identification has not reached a predetermined plurality of times (predetermined value M) at the start of operation of the multiphase conversion unit 2, then the control unit 3 performs soft start control on the group of voltage conversion units indicated by the phase information (non-corresponding group of voltage conversion units). When performing soft start control on the non-corresponding group of voltage conversion units, the control unit 3 (abnormality identifying unit) identifies again whether or not this non-corresponding group of voltage conversion units generates an abnormal current or an abnormal voltage based on a result of detection by the detection unit 8. If it is again identified that the non-corresponding group of voltage conversion units generates an abnormal current or an abnormal voltage, then the control unit 3 disables execution of voltage conversion by the non-corresponding group of voltage conversion units. In contrast, if no such identification is made again, then at least the non-corresponding group of voltage conversion units continue the voltage conversion. Lastly, only the voltage conversion units whose voltage conversion are not disabled perform voltage conversion in the steady output state.

Other Embodiments

The present invention is not limited to the embodiments explained with reference to the description above and the drawings, and the technical scope of the present invention encompasses the following embodiments, for example.

(1) Embodiment 1 has shown a step-down multiphase converter as an example, but a step-up multiphase converter or a step up and down multiphase converter may also be used.

(2) In Embodiment 1, a switching element SBk is arranged on the low side of each phase where k is an integer of 1 to m, but in place thereof, a diode whose anode is connected to a ground potential may be used. Furthermore, the switching elements SAk and SBk may also be P-channel type MOSFETs, or other switching elements such as bipolar transistors.

(3) The specific configurations of the primary side power supply portion 91 and the secondary side power supply portion 92 of Embodiment 1 are merely examples, and the type of the electrical storage means and voltages generated by the electrical storage means are not limited to the above-described examples, and may vary. Furthermore, a configuration is also possible in which no secondary side power supply portion is included, for example.

(4) In the example of FIG. 1, power generators, loads, and the like that are connected to the input-side conductive path and the output-side conductive path are not shown, but various devices and electronic components may be connected to the input-side conductive path and the output-side conductive path.

(5) In FIG. 1, a four-phase structure multiphase converter 1 in which four voltage conversion units CV1, CV2, CV3, and CV4 are connected in parallel to each other is shown as a representative example, but the number of voltage conversion units may be a plural number less than 4, or a plural number at least 5.

The invention claimed is:
1. A multiphase converter comprising:
a multiphase conversion unit provided with a plurality of voltage conversion units configured to convert an input voltage and output a converted voltage;
a control unit configured to individually control the plurality of voltage conversion units using control signals so that the converted voltage is equal to a target value, and to subject, when an operation of the multiphase conversion unit is started, the plurality of voltage conversion units to soft start control of gradually increasing the target value for an output of a respective voltage conversion unit in the plurality of voltage conversion units, the control unit offsetting a period of time in which any individual voltage conversion unit in the plurality of voltage conversion units are subjected to soft start control against each other;

a detection unit configured to detect a value reflecting at least one of an output current and an output voltage on a common output path from the plurality of voltage conversion units;

an abnormality identifying unit configured to identify an abnormal voltage conversion unit in the plurality of voltage conversion units that generates an abnormal current or an abnormal voltage, based on a result of detection by the detection unit during the time periods in which the soft start control is performed by the control unit; and a storage unit configured to store, if each abnormal voltage conversion unit identified by the abnormality identifying unit that generates an abnormal voltage a predetermined number of times, abnormality identification information indicating the abnormal voltage conversion unit that has been identified the predetermined number of times, wherein the control unit disables, if the abnormality identification information is stored in the storage unit, execution of voltage conversion by the abnormal voltage conversion unit that corresponds to the abnormality identification information without subjecting the abnormal voltage conversion unit to soft start control, and subjects any abnormal voltage conversion unit that does not correspond to the abnormality identification information to soft start control, when the operation of the multiphase conversion unit is started, and the abnormality identifying unit identifies whether or not any of the abnormal voltage conversion units that is started generates an abnormal current or an abnormal voltage, based on a result of detection by the detection unit during the period of time in which the abnormal voltage conversion unit is subjected to the soft start control.

2. A multiphase converter comprising:

a multiphase conversion unit provided with a plurality of voltage conversion units configured to convert an input voltage and output a converted voltage;

a control unit configured to individually control the plurality of voltage conversion units using control signals so that the converted voltage is equal to a target value, and to subject, when an operation of the multiphase conversion unit is started, the plurality of voltage conversion units to soft start control of gradually increasing the target value for an output of a respective voltage conversion unit in the plurality of voltage conversion units, the control unit offsetting a period of time in which any individual voltage conversion unit in the plurality of voltage conversion units are subjected to soft start control against each other;

a detection unit configured to detect a value reflecting at least one of an output current and an output voltage on a common output path from the plurality of voltage conversion units;

an abnormality identifying unit configured to identify an abnormal voltage conversion unit in the plurality of voltage conversion units that generates an abnormal current or an abnormal voltage, based on a result of detection by the detection unit during the time periods in which the soft start control is performed by the control unit; and a storage unit configured to store, each time any one of the voltage conversion units in the plurality of voltage conversion units is identified by the abnormality identifying unit each voltage conversion unit as an abnormal voltage conversion unit, wherein phase information indicating the abnormal voltage conversion unit is made in association with the number of times each of the abnormal voltage conversion unit has been identified, wherein the control unit disables, if the phase information is stored in the storage unit and the number of times of the abnormal voltage conversion unit has been identified that is indicated by the phase information has reached a predetermined plurality of times, execution of voltage conversion by the abnormal voltage conversion unit is made without the soft start control, and subjects, if the phase information is stored in the storage unit and the number of times of identification has not reached the predetermined plurality of times, the other voltage conversion units to soft start control, when the operation of the multiphase conversion unit is started, when the voltage conversion unit that is subjected to soft start control, the abnormality identifying unit identifies again whether or not the voltage conversion unit subjected to a soft start control generates an abnormal current or an abnormal voltage based on a result of detection by the detection unit, and the control unit disables, if the abnormality identifying unit again identifies that the voltage conversion unit subject to a soft control generates an abnormal current or an abnormal voltage, and execution of voltage conversion by the voltage conversion unit continues for each voltage conversion unit wherein no such identification is made again, when the operation of the multiphase conversion unit is started.

3. The multiphase converter according to claim 1, wherein, if any abnormal voltage conversion unit is identified by the abnormality identifying unit, the control unit disables execution of voltage conversion by the abnormal voltage conversion unit, and enables the remaining voltage conversion units of the multiphase conversion unit to perform voltage conversion, the control unit setting a target value for the output of the remaining voltage conversion units that is smaller than a target value when all of the multiphase conversion units are enabled.

4. The multiphase converter according to claim 2, wherein, if any abnormal voltage conversion unit is identified by the abnormality identifying unit, the control unit disables execution of voltage conversion by the abnormal voltage conversion unit, and enables the remaining voltage conversion units of the multiphase conversion unit to perform voltage conversion, the control unit setting a target value for the output of the remaining voltage conversion units that is smaller than a target value when all of the multiphase conversion units are enabled.

* * * * *